US010694136B2

(12) United States Patent
Chen (10) Patent No.: US 10,694,136 B2
(45) Date of Patent: Jun. 23, 2020

(54) METHOD, APPARATUS AND ELECTRONIC DEVICE FOR INTERFACE INVOKING

(71) Applicant: Lenovo (Beijing) Co., Ltd., Beijing (CN)

(72) Inventor: Jianfeng Chen, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 0 days.

(21) Appl. No.: 14/192,209

(22) Filed: Feb. 27, 2014

(65) Prior Publication Data

US 2014/0240198 A1 Aug. 28, 2014

(30) Foreign Application Priority Data

Feb. 27, 2013 (CN) .......................... 2013 1 0062329

(51) Int. Cl.
| G06F 9/451 | (2018.01) |
| H04N 5/44 | (2011.01) |
| H04N 21/41 | (2011.01) |
| H04N 21/422 | (2011.01) |
| H04N 21/442 | (2011.01) |

(Continued)

(52) U.S. Cl.
CPC .......... H04N 5/4403 (2013.01); G06F 9/452 (2018.02); H04M 1/72533 (2013.01);

(Continued)

(58) Field of Classification Search
CPC .. G06F 2203/0383; G06F 9/451; G06F 9/452; G06F 3/1454; H04N 5/4403;

(Continued)

(56) References Cited

U.S. PATENT DOCUMENTS 6,563,430 B1 * 5/2003 Kemink ........... H04N 21/42202
340/12.22
8,228,293 B2 * 7/2012 Dohta ..................... A63F 13/10
345/158

(Continued)

FOREIGN PATENT DOCUMENTS

| CN | 102421029 A | 4/2012 |
| CN | 102739800 A | 10/2012 |

OTHER PUBLICATIONS

First Chinese Office Action regarding Application No. 201310062329.6 dated Aug. 18, 2016. English translation provided by Unitalen Attorneys at Law.

*Primary Examiner* — Jeff Piziali
(74) *Attorney, Agent, or Firm* — Harness, Dickey & Pierce, P.L.C.

(57) ABSTRACT

A method, device and electronic device for interface invoking are disclosed according to the embodiments of the invention. The method is applicable in a first electronic device having at least a display unit, and includes: judging whether a distance between the first electronic device and a second electronic device is not greater than a preset distance, to obtain a first judgment result; in a case that the first judgment result is positive, controlling an application in the first electronic device for manipulating the second electronic device to be in an on-state, and displaying an operating interface corresponding to the application on the display unit of the first electronic device; and in a case that the first judgment result is negative, controlling the operating interface to be in an off-state or hidden state.

9 Claims, 9 Drawing Sheets (51) Int. Cl.
*H04N 21/414* (2011.01)
*H04M 1/725* (2006.01)
*G06F 3/14* (2006.01)

(52) U.S. Cl.
CPC ... *H04N 21/4122* (2013.01); *H04N 21/41407* (2013.01); *H04N 21/4222* (2013.01); *H04N 21/42222* (2013.01); *H04N 21/44227* (2013.01); *G06F 3/1454* (2013.01); *G09G 2354/00* (2013.01); *G09G 2356/00* (2013.01); *H04N 2005/4425* (2013.01)

(58) Field of Classification Search
CPC ......... H04N 21/4122; H04N 21/42222; H04N 21/44227; H04N 21/41407; H04N 21/4222; H04N 2005/4425; H04M 1/72533; G09G 2354/00; G09G 2356/00
See application file for complete search history.

(56) References Cited

U.S. PATENT DOCUMENTS

| | | | |
|---|---|---|---|
| 8,384,698 B2* | 2/2013 | Kong | G06F 3/0346 345/158 |
| 9,098,129 B2* | 8/2015 | Ting | G06F 3/038 |
| 2004/0264916 A1* | 12/2004 | Van De Sluis | H04M 1/7253 386/200 |
| 2005/0270494 A1* | 12/2005 | Banning | G03B 21/00 353/42 |
| 2006/0152487 A1* | 7/2006 | Grunnet-Jepsen | G06F 3/0346 345/158 |
| 2007/0013657 A1* | 1/2007 | Banning | G06F 3/0346 345/157 |
| 2007/0060383 A1 | 3/2007 | Dohta | |
| 2009/0231582 A1* | 9/2009 | Aebischer | G01S 17/42 356/364 |
| 2010/0309051 A1* | 12/2010 | Moshfeghi | G01S 5/0236 342/378 |
| 2010/0333032 A1* | 12/2010 | Lau | H04N 5/4403 715/835 |
| 2011/0114716 A1* | 5/2011 | Pratt | H04L 12/2814 235/375 |
| 2011/0225330 A1* | 9/2011 | Lavian | H04M 1/72527 710/63 |
| 2012/0297019 A1* | 11/2012 | Ting | G06F 3/038 709/217 |
| 2014/0240198 A1* | 8/2014 | Chen | H04N 5/4403 345/1.1 |

\* cited by examiner

METHOD, APPARATUS AND ELECTRONIC DEVICE FOR INTERFACE INVOKING

CROSS REFERENCE TO RELATED APPLICATION

This application claims the benefit of priority to Chinese Patent Application No. 201310062329.6, entitled "METHOD, APPARATUS AND ELECTRONIC DEVICE FOR INTERFACE INVOKING", filed on Feb. 27, 2013 with State Intellectual Property Office of PRC, which is incorporated herein by reference in its entirety.

FIELD

The present invention relates to the technical field of communication, and in particular to a method, apparatus and electronic device for interface invoking.

BACKGROUND

In the existing multi-screen interaction application, a first electronic device is used to control a second electronic device. For example, the first electronic device may be a mobile phone, the second electronic device may be a TV, and the mobile phone can control the channel switch and volume of the TV.

To achieve the multi-screen interaction application, a client needs to be installed in the first electronic device, and when a user needs the multi-screen interaction function, the user needs to find in the first electronic device an application of the second electronic device and start the application, so that the first electronic device displays an operating interface corresponding to the application, and the user can control the second electronic device via the key(s) in the operating interface.

It is discovered by the inventor during the implementing the invention that when the user needs to control the second electronic device by using the first electronic device, the user needs to find and start in the first electronic device the corresponding application, and when the user does not need to control the second electronic device, the user needs to close the application, thus the operation for the user is complicated.

SUMMARY

In view of this, it is provided an operating interface invoking method according to an embodiment of the invention, for overcoming the problem in the prior art that the operation for the user is complicated.

To achieve the above object, the following technical solutions are provided in the disclosure.

In a first aspect, it is provided a method for interface invoking applicable in a first electronic device having at least a display unit, and the method includes:

judging whether a distance between the first electronic device and a second electronic device is not greater than a preset distance, to obtain a first judgment result;

in a case that the first judgment result indicates that the distance between the first electronic device and the second electronic device is not greater than the preset distance, controlling an application in the first electronic device to be in an on-state, and displaying an operating interface corresponding to the application on the display unit of the first electronic device, wherein the application is adapted to manipulate the second electronic device; and in a case that the first judgment result indicates that the distance between the first electronic device and the second electronic device is greater than the preset distance, controlling the operating interface to be in an off-state or a hidden state.

In a first possible implementation of the first aspect, a distance sensor may be provided in the first electronic device, and may be adapted to obtain distance information between the first electronic device and the second electronic device.

In conjunction with the first aspect or in conjunction with the first possible implementation of the first aspect, in a second possible implementation, the judging whether a distance between the first electronic device and a second electronic device is not greater than a preset distance may include:

judging whether broadcast information sent by the second electronic device is received; and in a case that the broadcast information is received, determining that the distance between the first electronic device and the second electronic device is not greater than the preset distance.

In conjunction with the first aspect or in conjunction with the first possible implementation of the first aspect, in a third possible implementation, the judging whether a distance between the first electronic device and a second electronic device is not greater than a preset distance may include:

judging whether broadcast information is received for times not less than a preset number of times during a first preset time period; and in a case that the broadcast information is received for times not less than the preset number of times, determining that the distance between the first electronic device and the second electronic device is not greater than the preset distance.

In conjunction with the first aspect or in conjunction with the first possible implementation of the first aspect, in a fourth possible implementation, the judging whether a distance between the first electronic device and a second electronic device is not greater than a preset distance may include:

judging whether difference between a time instance for the most recent receipt of broadcast information and a current time instance is not less than a second preset time; and in a case that the difference is not less than the second preset time, determining that the distance between the first electronic device and the second electronic device is greater than the preset distance.

In a fifth possible implementation of the first aspect, the method may further include:

after an instruction to forbid starting the application is received, stopping triggering to start the application; and during a third preset time period, stopping judging whether the distance between the first electronic device and the second electronic device is not greater than the preset distance.

In a sixth possible implementation of the first aspect, the second electronic device may include at least one electronic device, and the displaying an operating interface corresponding to the application on the display unit of the first electronic device may include:

setting priorities of respective electronic devices in the second electronic device; and based on the priorities, instructing the display unit of the first electronic device to display the operating interface of the application corresponding to the electronic device with the highest priority in the second electronic device.

In a seventh possible implementation of the first aspect, the second electronic device may include at least one electronic device, and the displaying an operating interface corresponding to the application on the display unit of the first electronic device may include:

instructing the display unit of the first electronic device to display shortcuts of the operating interfaces of the applications corresponding to respective electronic devices in the second electronic device, and instructing the display unit of the first electronic device to display the operating interface of the application corresponding to the shortcut selected by a user.

In an eighth possible implementation of the first aspect, the method may further include: before the displaying an operating interface corresponding to the application on the display unit of the first electronic device, judging whether the first electronic device is in a standby state; and in a case that the first electronic device is in the standby state, the displaying an operating interface corresponding to the application on the display unit of the first electronic device may include:

instructing to display the operating interface of the application on a unlocking interface of the first electronic device, for manipulating the second electronic device by a user.

In conjunction with the eighth possible implementation of the first aspect, in the ninth possible implementation, the method may further include:

after an unlocking instruction is detected, performing an unlocking operation and instructing the display unit of the first electronic device to display the operating interface.

In a second aspect, it is provided an interface invoking apparatus including a display unit, wherein the interface invoking apparatus includes:

a first judgment unit adapted to judge whether a distance between the first electronic device and a second electronic device is not greater than a preset distance, to obtain a first judgment result;

a first control unit adapted to control an application in the first electronic device to be in an on-state in a case that the first judgment result indicates that the distance between the first electronic device and the second electronic device is not greater than the preset distance, wherein the application is adapted to manipulate the second electronic device;

a first display unit adapted to display an operating interface corresponding to the application on the display unit of the first electronic device after the first control unit controls the application in the first electronic device to be in the on-state; and a second control unit adapted to control the operating interface to be in an off-state or hidden state in a case that the first judgment result indicates that the distance between the first electronic device and the second electronic device is greater than the preset distance.

In a first possible implementation of the second aspect, a distance sensor may be provided in the first judgment unit, and may be adapted to obtain distance information between the first electronic device and the second electronic device.

In conjunction with the second aspect or the first possible implementation of the second aspect, in a second possible implementation, the first judgment unit may include:

a first judgment module adapted to judge whether broadcast information sent by the second electronic device is received; and a first determination module adapted to determine that the distance between the first electronic device and the second electronic device is not greater than the preset distance in a case that the broadcast information is received.

In conjunction with the second aspect or the first possible implementation of the second aspect, in a third possible implementation, the first judgment unit may include:

a second judgment module adapted to judge whether broadcast information is received for times not less than a preset number of times during a first preset time period; and a second determination module adapted to determine that the distance between the first electronic device and the second electronic device is not greater than the preset distance in a case that the broadcast information is received for times not less than the preset number of times.

In conjunction with the second aspect or the first possible implementation of the second aspect, in a fourth possible implementation, the first judgment unit may include:

a third judgment module adapted to judge whether difference between a time instance for the most recent receipt of broadcast information and a current time instance is not less than a second preset time; and a third determination module adapted to determine that the distance between the first electronic device and the second electronic device is greater than the preset distance in a case that the difference is not less than the second preset time.

In a fifth possible implementation of the second aspect, the interface invoking apparatus may further include:

a receiving unit adapted to stop triggering to start the application after an instruction to forbid starting the application is received; and a stop triggering unit adapted to stop triggering the first judgment unit during a third preset time period.

In a sixth possible implementation of the second aspect, the second electronic device may include at least one electronic device, and the first display unit may include:

a setting module adapted to set priorities of respective electronic devices in the second electronic device; and a first instructing module adapted to instruct the display unit of the first electronic device to display the operating interface of the application corresponding to the electronic device with the highest priority based on the priorities.

In a seventh possible implementation of the second aspect, the second electronic device may include at least one electronic device, and the first display unit may include:

a second instructing module adapted to instruct the display unit of the first electronic device to display shortcuts of the operating interfaces of the applications corresponding to respective electronic devices in the second electronic device, and instruct the display unit of the first electronic device to display the operating interface of the application corresponding to the shortcut selected by a user.

In an eighth possible implementation of the second aspect, the second electronic device may include at least one electronic device, the interface invoking apparatus may further include:

a second judgment unit adapted to judge whether the first electronic device is in a standby state; and the first display unit is adapted to instruct to display the operating interface of the application on a unlocking interface of the first electronic device after the first control unit controls the application in the first electronic device to be in the on-state, for manipulating the second electronic device by a user.

In conjunction with the eighth possible implementation of the second aspect, in a ninth possible implementation, the interface invoking apparatus may further include:

an instructing unit adapted to, after an unlocking instruction is detected, perform an unlocking operation and instruct the display unit of the first electronic device to display the operating interface.

In a third aspect, it is provided an electronic device including the interface invoking apparatus of the second aspect or any interface invoking apparatus in any of the possible implementations of the interface invoking apparatus of the second aspect.

It can be seen from above technical solutions that as compared with the prior art, a method for interface invoking is disclosed in the disclosure, which includes: judging whether a distance between a first electronic device and a second electronic device is not greater than a preset distance, to obtain a first judgment result; in a case that the first judgment result indicates that the distance between the first electronic device and the second electronic device is not greater than the preset distance, controlling an application in the first electronic device adapted to manipulate the second electronic device to be in an on-state, and displaying an operating interface corresponding to the application on the display unit of the first electronic device; and in a case that the first judgment result indicates that the distance between the first electronic device and the second electronic device is greater than the preset distance, controlling the operating interface to be in an off-state or hidden state. With the method provided in the disclosure, when the distance between the first electronic device and the second electronic device is not greater than the preset distance, the application in the first electronic device for manipulating the second electronic device is automatically in an on-state, and the operating interface corresponding to the application is displayed automatically on the display unit of the first electronic device, the user does not need to find or start the application in the first electronic device for manipulating the second electronic device, and does not need to close or hide the application, so that the operation is simplified and easier.

BRIEF DESCRIPTION OF THE DRAWINGS

In order to illustrate the technical solutions according to the embodiments of the present invention or in the prior art more clearly, drawings to be used in the description of the prior art or the embodiments will be described briefly hereinafter. Apparently, the drawings described hereinafter are only some embodiments of the present invention, and other drawings may be obtained by those skilled in the art according to those drawings without creative labor.

DETAILED DESCRIPTION

The technical schemes according to the embodiments of the present disclosure will be clearly and fully described in the following in conjunction with the drawings. Apparently, the embodiments described are only some of the embodiments of the present disclosure, rather than all the embodiments. Based on the embodiments of the present disclosure, all other embodiments that are acquired by those skilled in the art without inventive effort are all within the scope of the present disclosure.

Figure 1:
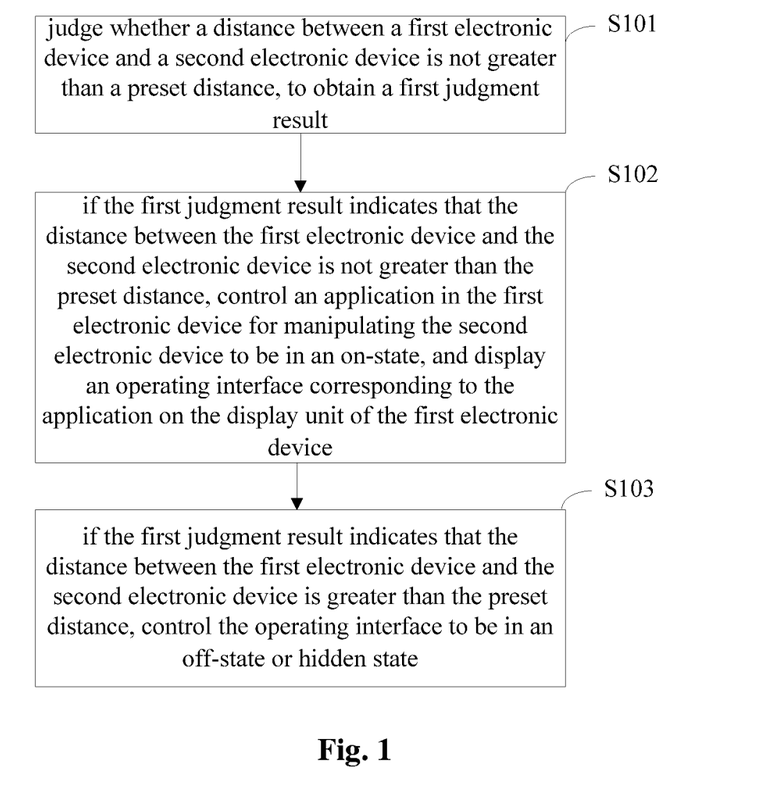
FIG. 1 is a schematic flow chart of a method for interface invoking according to an embodiment of the invention.

Reference is made to FIG. 1, which is a schematic flow chart of a method for interface invoking according to an embodiment of the invention. The method includes the following steps S101 to S103.

Step S101: judging whether a distance between the first electronic device and a second electronic device is not greater than a preset distance, to obtain a first judgment result.

The preset distance depends on the specific condition of the first electronic device and the second electronic device, and is not limited herein. For example, the preset distance needs to be less than the effective range of the near field communication technology in the case where the first electronic device is a mobile phone, the second electronic device is a TV, and the distance between the first electronic device and the second electronic device is detected by the mobile phone through the near field communication technology.

Step S102: if the first judgment result indicates that the distance between the first electronic device and the second electronic device is not greater than the preset distance, controlling an application in the first electronic device for manipulating the second electronic device to be in an on-state, and displaying an operating interface corresponding to the application on the display unit of the first electronic device.

Step S103: if the first judgment result indicates that the distance between the first electronic device and the second electronic device is greater than the preset distance, controlling the operating interface to be in an off-state or hidden state.

The expression that the operating interface is in an off-state may refer to the situation that both the operating interface and the application corresponding to the operating interface are in an off-state. The expression that the operating interface is in a hidden state may refer to the scene where the application corresponding to the operating interface functions as a background program of the first electronic device and the operating interface is not displayed on the displaying interface.

According to the method of the present embodiment, if the distance between the first electronic device and the second electronic device is not greater than the preset distance, the application in the first electronic device for manipulating the second electronic device is started automatically, and the operating interface corresponding to the application is displayed automatically on the display unit of the first electronic device. There is no need for the user to find or start the application in the first electronic device for manipulating the second electronic device, or to close or hide this application, so that the operation is simplified and easier.

Figure 2:
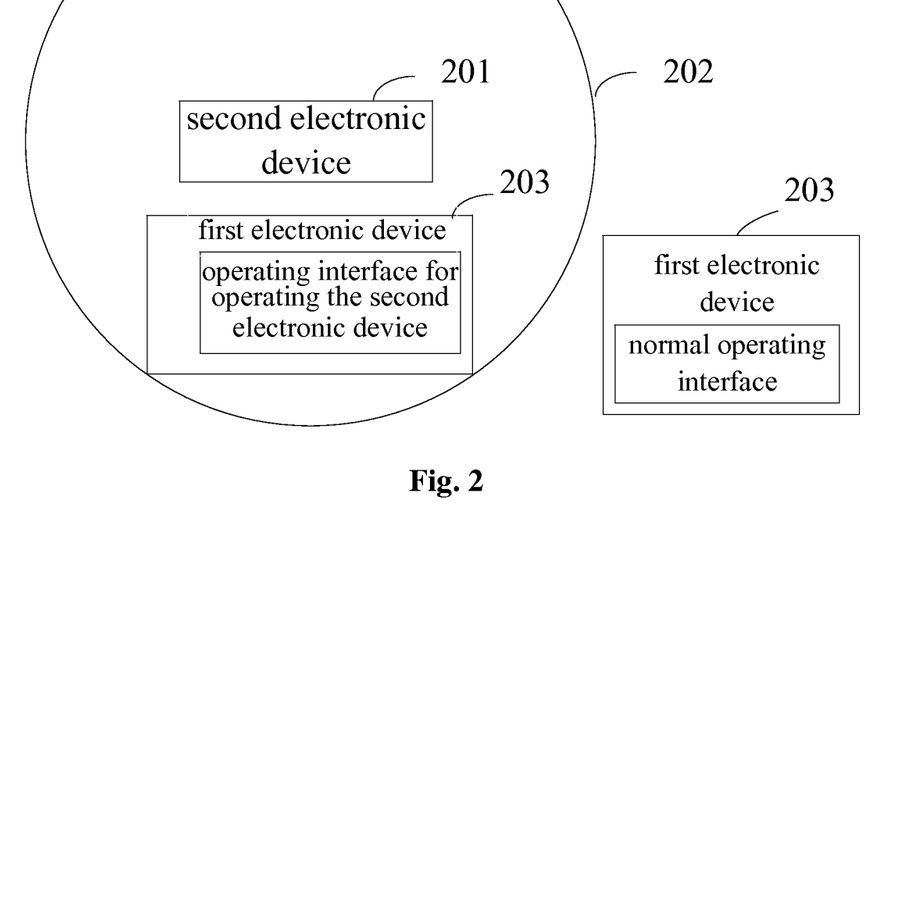
FIG. 2 is a schematic diagram of a scene of a method for interface invoking according to an embodiment of the invention.

For better understanding by those skilled in the art, the above embodiment is further described in conjunction with an example. Reference is made to FIG. 2, which is a schematic diagram of a scene of a method for interface invoking, according to an embodiment of the invention.

FIG. 2 includes a second electronic device 201, a circle 202 which takes the second electronic device 201 as a center and a preset distance as a radius, and a first electronic device 203.

If the first electronic device 203 is located within the circle 202 or on the boundary of the circle 202, it is indicated that the distance between the first electronic device 203 and the second electronic device 201 is not greater than the preset distance; while if the first electronic device 203 is located outside the circle 202, it is indicated that the distance between the first electronic device 203 and a second electronic device 201 is greater than the preset distance.

As shown in FIG. 2, when the distance between the first electronic device 203 and the second electronic device 201 is greater than the preset distance, a normal interface of the first electronic device 203 is displayed on the display unit of the first electronic device 203. For example, in the case where the first electronic device 203 is a mobile phone, the normal interface may be the locked up interface, the dialing interface, the contact interface, or the like. When the distance between the first electronic device 203 and the second electronic device 201 is not greater than the preset distance, the application in the first electronic device 203 for manipulating the second electronic device 201 is started, and the operating interface for manipulating the second electronic device 201 is displayed on the display unit of the first electronic device 203. The user can control the second electronic device 201 directly via the operating interface.

Two first electronic devices 203 are shown in FIG. 2 for illusionary description. One of the first electronic devices 203 is located within the circle 203, and then the operating interface for manipulating the second electronic device 201 is displayed on the display unit of the first electronic device 203 (the content displayed on the display unit of this first electronic device 203 is represented by "the operating interface for operating the second electronic device" in FIG. 2). The other first electronic device 203 is located outside the circle 203, and then the normal interface is displayed on the display unit of the first electronic device 203 (the content displayed on the display unit of this first electronic device 203 is represented by "the normal operating interface" in FIG. 2).

Figure 3:
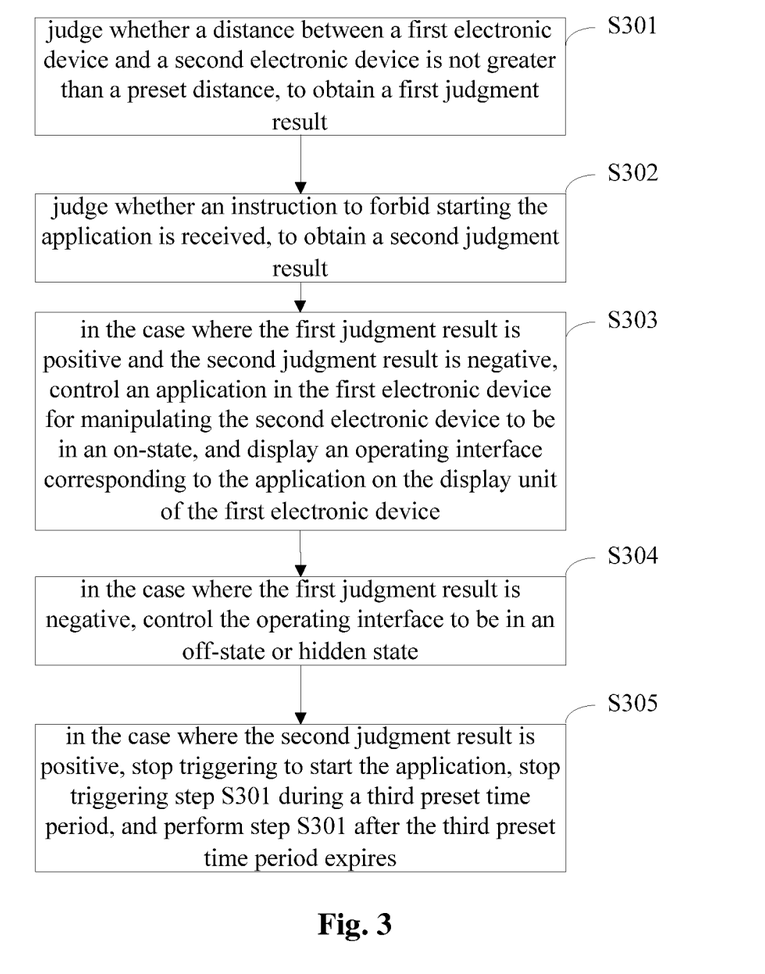
FIG. 3 is a schematic flow chart of a method for interface invoking according to another embodiment of the invention.

Reference is made to FIG. 3, which is a schematic flow chart of a method for interface invoking according to another embodiment of the invention. The method includes the following steps S301 to S305.

Step S301: judging whether a distance between a first electronic device and a second electronic device is not greater than a preset distance, to obtain a first judgment result.

Step S302: judging whether an instruction to forbid starting the application is received, to obtain a second judgment result.

In order to refrain from starting the application in the first electronic device for manipulating the second electronic device in the case that the first judgment result indicates that the distance between the first electronic device and the second electronic device is not greater than the preset distance, an option of "starting the corresponding application or not" may be displayed on the display unit of the first electronic device in the case that the distance between the first electronic device and the second electronic device is not greater than the preset distance, so that the user may make a choice as required. If the user selects "NO", an instruction to forbid starting the application is generated, and at this time, the user can set the valid time for the instruction to forbid starting the application by himself, or a default valid time set in the first electronic device may be employed.

Alternatively, in the case where it is not needed to manipulate the second electronic device via the first electronic device, in order to refrain from starting the application in the first electronic device for manipulating the second electronic device in the case that the first judgment result indicates that the distance between the first electronic device and the second electronic device is not greater than the preset distance, the user may set the valid time of the instruction to forbid starting the application in advance. During the valid time, even if the distance between the first electronic device and the second electronic device is not greater than the preset distance, the application in the first electronic device for manipulating the second electronic device is not in the on-state. The valid time for the instruction to forbid starting the application may also be defined by the system of the first electronic device. In this case, the sequence for executing the step S301 and step S302 is not limited.

Step S303, in the case where the first judgment result is positive and the second judgment result is negative, controlling an application in the first electronic device for manipulating the second electronic device to be in an on-state, and displaying an operating interface corresponding to the application on the display unit of the first electronic device.

Step S304, in the case where the first judgment result is negative, controlling the operating interface to be in an off-state or hidden state.

In the case where the first judgment result is negative, the operating interface is controlled to be in an off-state or hidden state, no matter what the second judgment result is.

Step S305, in the case where the second judgment result is positive, stop triggering to start the application, stopping the step S301 of triggering during a third preset time period, and performing step S301 after the third preset time period expires.

In the case where the second judgment result is positive, the operation of "stopping triggering to start the application" is performed, even if the first judgment result is positive.

Figure 4:
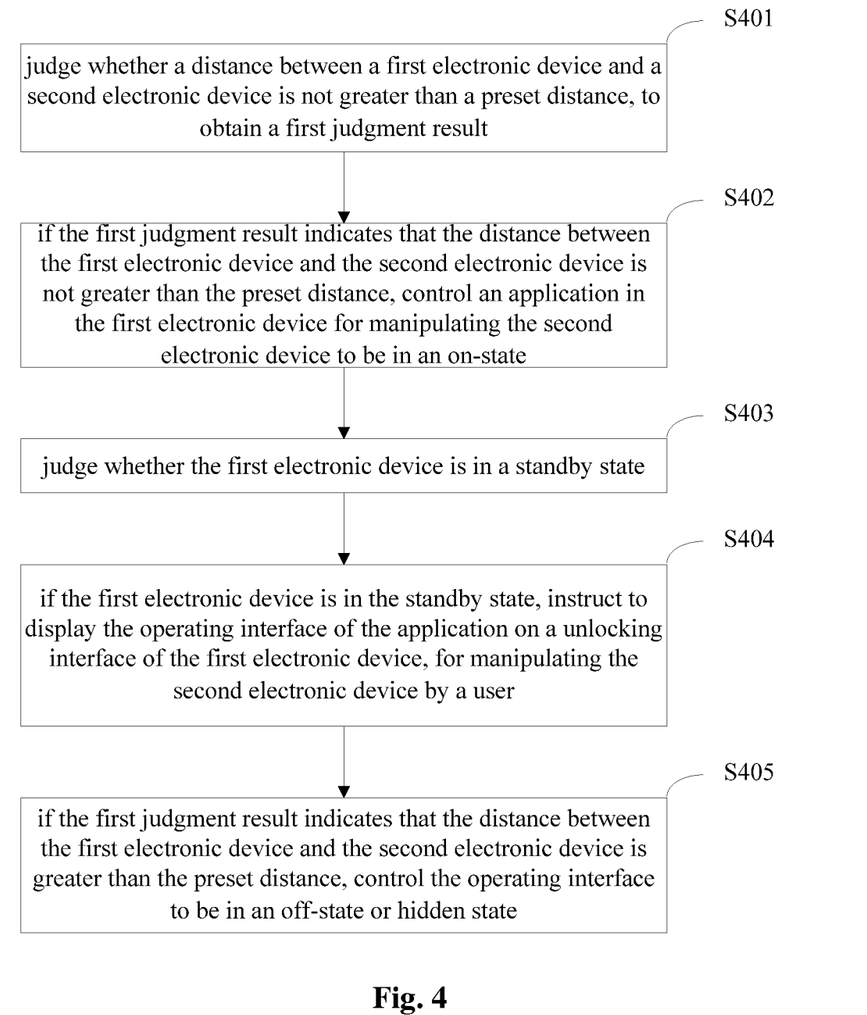
FIG. 4 is a schematic flow chart of a method for interface invoking according to yet another embodiment of the invention.

Reference is made to FIG. 4, which is a schematic flow chart of a method for interface invoking according to yet another embodiment of the invention. The method includes the following steps S401 to S405.

S401: judging whether a distance between a first electronic device and a second electronic device is not greater than a preset distance, to obtain a first judgment result.

S402: if the first judgment result indicates that the distance between the first electronic device and the second electronic device is not greater than the preset distance, controlling an application in the first electronic device for manipulating the second electronic device to be in an on-state.

S403: judging whether the first electronic device is in a standby state.

S404: if the first electronic device is in the standby state, instructing to display the operating interface of the application on a unlocking interface of the first electronic device, to facilitate manipulating the second electronic device by the user.

The operating interface of the application is displayed on the unlocking interface of the first electronic device if the first electronic device is in the standby state, thus the user may manipulate the second electronic device on the unlocking interface of the first electronic device without needing to unlock the first electronic device.

The user may also perform the unlocking operation. In this case, the first electronic device is unlocked and the display unit of the first electronic device is instructed to display the operating interface after an unlocking instruction is detected.

S405: if the first judgment result indicates that the distance between the first electronic device and the second electronic device is greater than the preset distance, controlling the operating interface to be in an off-state or hidden state.

The method according to this embodiment of the invention can also include step S302, and in this case, the S402 is to instruct to display the operating interface of the application on the unlocking interface of the first electronic device in the case where the first judgment result is positive, the second judgment result is negative, and the first electronic device is in the standby state, to facilitate the manipulating of the second electronic device by the user.

Figure 5:
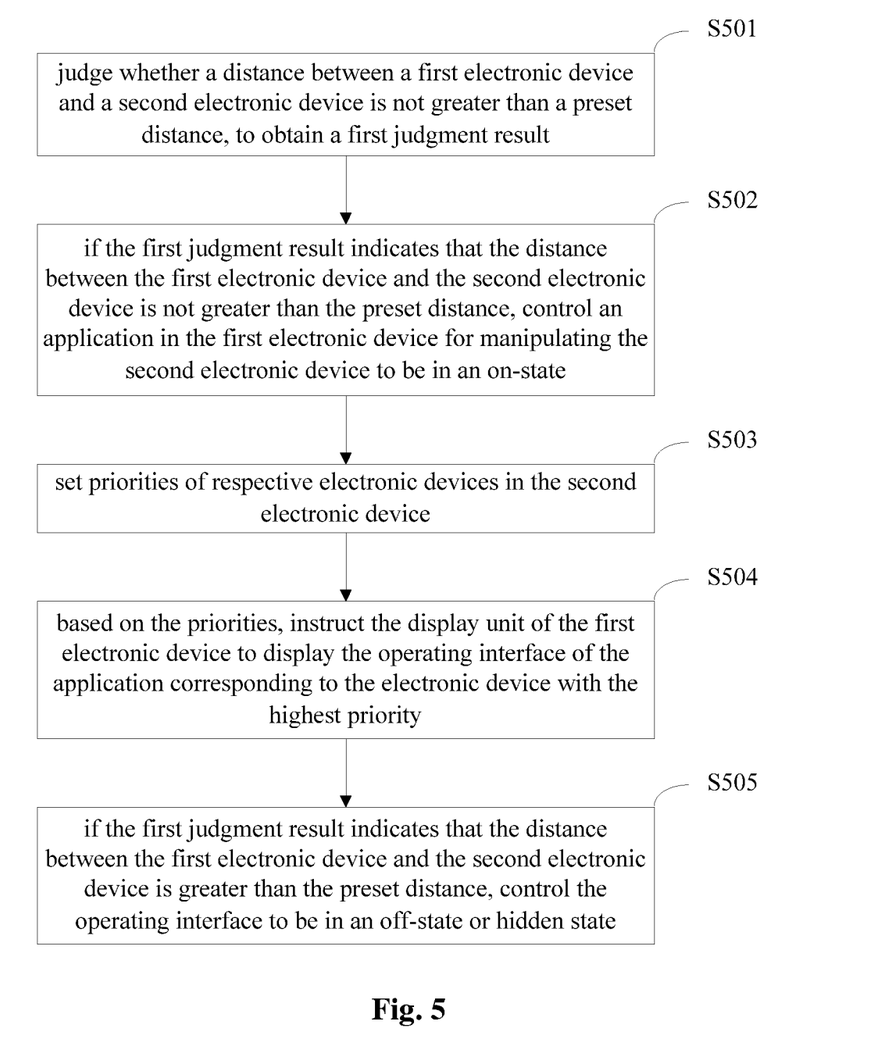
FIG. 5 is a schematic flow chart of a method for interface invoking according to still yet another embodiment of the invention.

Reference is made to FIG. 5, which is a schematic flow chart of a method for interface invoking according to still yet another embodiment of the invention. The method may include the following steps S501 to S505.

S501: judging whether a distance between a first electronic device and a second electronic device is not greater than a preset distance, to obtain a first judgment result.

S502: if the first judgment result indicates that the distance between the first electronic device and the second electronic device is not greater than the preset distance, controlling an application in the first electronic device for manipulating the second electronic device to be in an on-state.

S503: setting priorities of respective electronic devices in the second electronic device.

The priorities may be defined by the user, or may be defined by the first electronic device according to one or more of the frequency, time duration and time period for which the application corresponding to each second electronic device is used by the user. The first electronic device can update the priorities of respective electronic devices of the second electronic device after a period of time. For example, the first electronic device is a mobile phone, and the second electronic device includes a TV, a fridge and an air conditioner. If the frequency at which the mobile phone is used to manipulate the TV is highest, the frequency at which the mobile phone is used to manipulate the air conditioner is next highest, and the frequency at which the mobile phone is used to manipulate the fridge is the lowest during a certain time period, the priorities defined by the first electronic device in a descending order are: the TV, the air conditioner, and the fridge.

The so called time duration may refer to the time duration for which the application corresponding to each electronic device is used. For example, in a day, if the total time duration for which the first electronic device manipulates the TV of the second electronic device is 3 hours, the time duration for the application corresponding to the TV is 3 hours. The so called time period may refer to the specific time for which the application corresponding to each electronic device is used. For example, if the first electronic device manipulates the TV of the second electronic device from 2 pm to 4 pm, the time period for the application corresponding to the TV is 2 pm to 4 pm.

If the priorities are defined by the user, the first electronic device may not update the priorities.

Step S503 can be performed before step S501 or step S502. It is not required to perform Step S503 every time but only once when the application is performed initially; alternatively step S503 can be performed every time according to different requirements, which is not limited herein.

S504: based on the priorities, instructing the display unit of the first electronic device to display the operating interface of the application corresponding to the electronic device with the highest priority in the second electronic device.

S505: if the first judgment result indicates that the distance between the first electronic device and the second electronic device is greater than the preset distance, controlling the operating interface to be in an off-state or hidden state.

Figure 6:
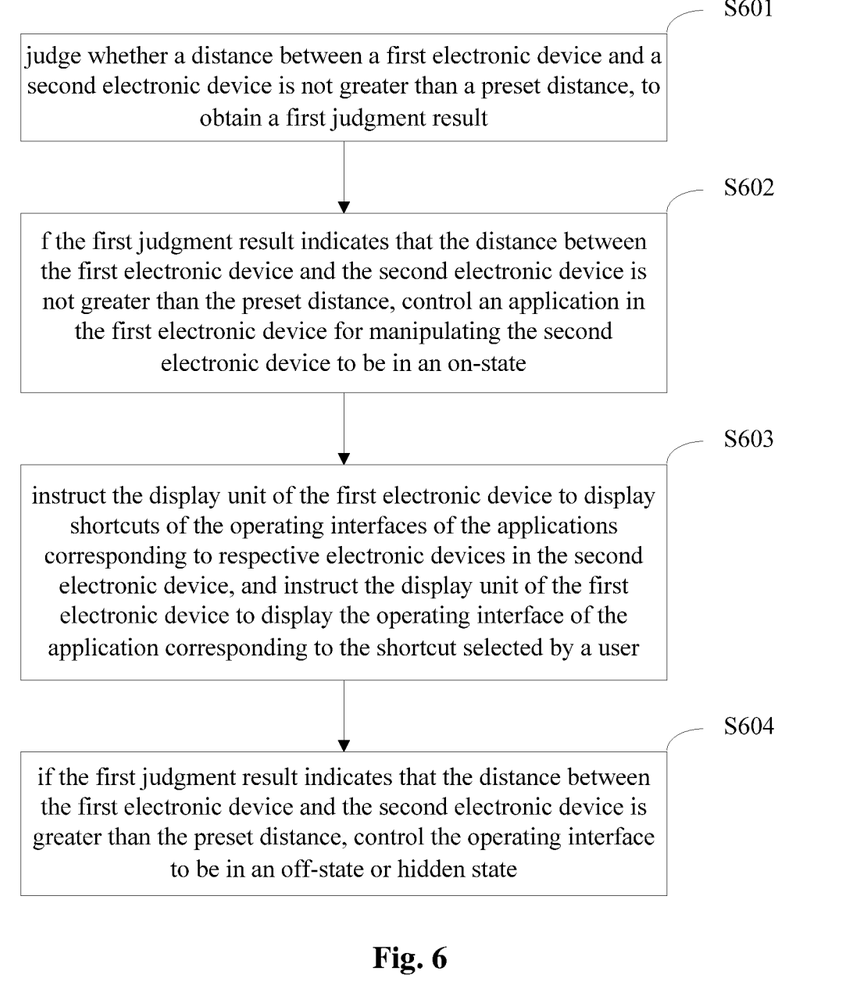
FIG. 6 is a schematic flow chart of a method for interface invoking according to a further embodiment of the invention.

Reference is made to FIG. 6, which is a schematic flow chart of a further example of a method for interface invoking according to an embodiment of the invention. The method can include the following steps S601 to S604.

S601: judging whether a distance between a first electronic device and a second electronic device is not greater than a preset distance, to obtain a first judgment result.

S602: if the first judgment result indicates that the distance between the first electronic device and the second electronic device is not greater than the preset distance, controlling an application in the first electronic device for manipulating the second electronic device to be in an on-state.

S603: instructing the display unit of the first electronic device to display shortcuts of the operating interfaces of the applications corresponding to respective electronic devices in the second electronic device, and instructing the display unit of the first electronic device to display the operating interface of the application corresponding to the shortcut selected by a user.

S604: if the first judgment result indicates that the distance between the first electronic device and the second electronic device is greater than the preset distance, controlling the operating interface to be in an off-state or hidden state.

There are many ways to judge whether a distance between a first electronic device and a second electronic device is not greater than a preset distance in any one of the above embodiments, three of which are described in detail below.

Figure 7:
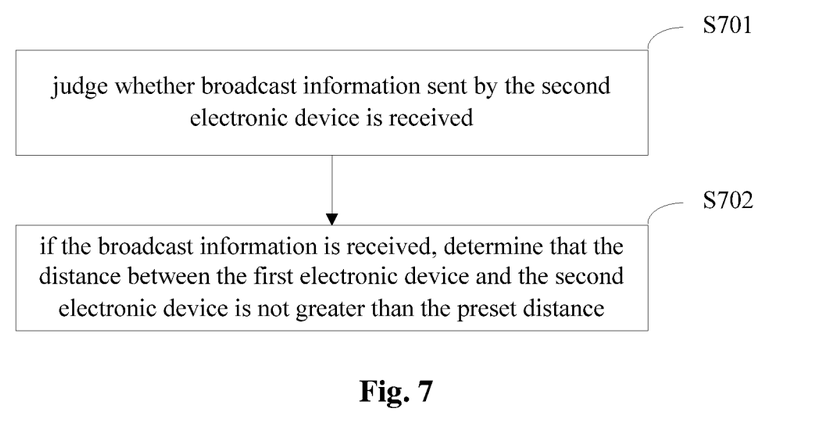
FIG. 7 is a schematic flow chart of a method for judging whether a distance between a first electronic device and a second electronic device is not greater than a preset distance according to an embodiment of the invention.

Reference is made to FIG. 7, which is a schematic flow chart of a method for judging whether a distance between a first electronic device and a second electronic device is not greater than a preset distance according to an embodiment of the invention. The method includes the following steps S701 and S702.

S701: judging whether broadcast information sent by the second electronic device is received.

The broadcast information can refer to the information transmitted in a wired or wireless manner.

S702: if the broadcast information is received, determining that the distance between the first electronic device and the second electronic device is not greater than the preset distance.

In this case, the first judgment result indicates that the distance between the first electronic device and the second electronic device is not greater than the preset distance.

If no broadcast information is received or distance information which indicates that the distance between the first electronic device and the second electronic device is greater than the preset distance is received, it is determined that the distance between the first electronic device and the second electronic device is greater than the preset distance. In this case, the first judgment result indicates that the distance between the first electronic device and the second electronic device is greater than the preset distance.

Figure 8:
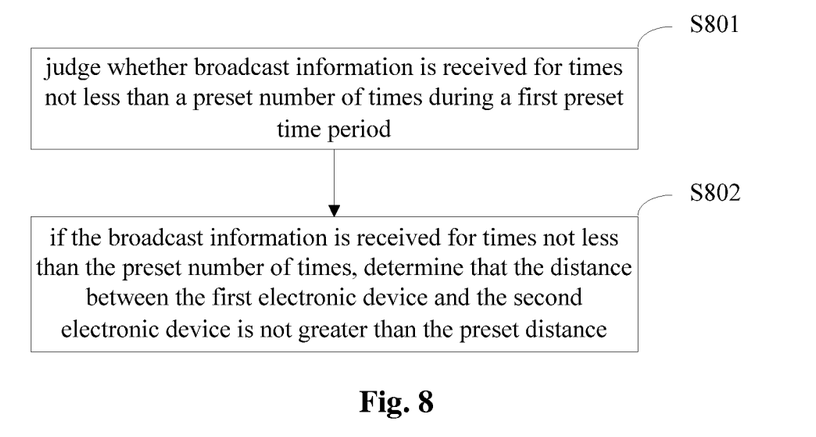
FIG. 8 is a schematic flow chart of another method for judging whether a distance between a first electronic device and a second electronic device is not greater than a preset distance according to an embodiment of the invention.

Reference is made to FIG. 8, which is a schematic flow chart of another method for judging whether a distance between a first electronic device and a second electronic device is not greater than a preset distance according to an embodiment of the invention. The method includes the following steps S801 and S802.

Step S801: judging whether broadcast information is received for times not less than a preset number of times during a first preset time period.

If the broadcast information is received for times greater than the preset number of times, it indicates that the control signal transmitted between the second electronic device and the first electronic device is strong and the interference to the control signal is weak, and the first electronic device may control the second electronic device accurately.

Step S802: if the broadcast information is received for times not less than the preset number of times, determining that the distance between the first electronic device and the second electronic device is not greater than the preset distance.

In this case, the first judgment result indicates that the distance between the first electronic device and the second electronic device is not greater than the preset distance.

If the broadcast information is received for times less than the preset number of times, or distance information which indicates that the distance between the first electronic device and the second electronic device is greater than the preset distance is received, it is determined that the distance between the first electronic device and the second electronic device is greater than the preset distance. In this case, the first judgment result indicates that the distance between the first electronic device and the second electronic device is greater than the preset distance.

Figure 9:
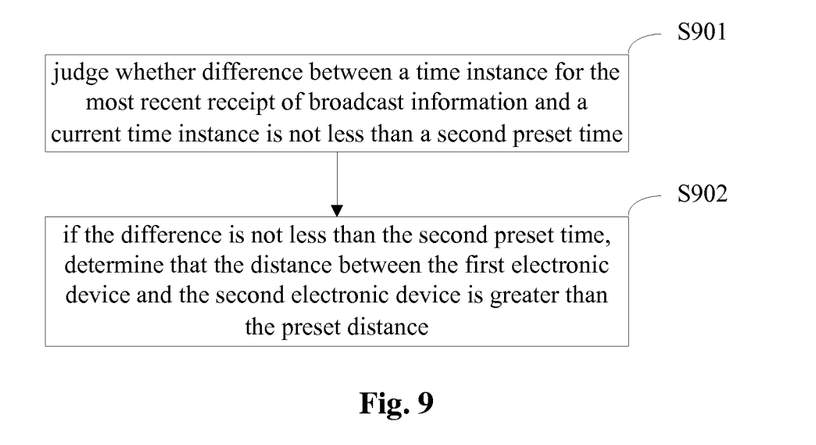
FIG. 9 is a schematic flow chart of yet another method for judging whether a distance between a first electronic device and a second electronic device is not greater than a preset distance according to an embodiment of the invention.

Reference is made to FIG. 9, which is a schematic flow chart of yet another method for judging whether a distance between a first electronic device and a second electronic device is not greater than a preset distance according to an embodiment of the invention. The method includes the following steps S901 and S902.

Step S901: judging whether a difference between a time instance for the most recent receipt of broadcast information and a current time instance is not less than a second preset time.

The second preset time may be determined based on specific circumstance.

The difference between the time instance for the most recent receipt of broadcast information and the current time instance equals to the difference obtained by subtracting the time instance for the most recent receipt of broadcast information from the current time instant.

Step S902: if the difference is not less than the second preset time, determining that the distance between the first electronic device and the second electronic device is greater than the preset distance.

It is assumed that the second preset time is 10 s. The timing is started since broadcast information is received by the first electronic device. If another pieced of broadcast information is received within 10 s, it indicates that the distance between the first electronic device and the second electronic device is not greater than the preset distance. In this case, the first judgment result indicates that the distance between the first electronic device and the second electronic device is not greater than the preset distance. If no broadcast information is received in the first electronic device within 10 s, it indicates that the distance between the first electronic device and the second electronic device is beyond the preset distance. In this case, the first judgment result indicates that the distance between the first electronic device and the second electronic device is greater than the preset distance.

A distance sensor may be provided in the first electronic device according to the embodiment of the invention. The distance sensor is adapted to obtain the distance information between the first electronic device and the second electronic device. The distance information may indicate whether the broadcast information is received, how many times the broadcast information is received, or the difference between the time instance for the most recent receipt of broadcast information and the current time instance, as described above.

The methods according to the embodiments of the invention have been described in detail above. The methods of this disclosure may be implemented in various devices. Accordingly, various devices are disclosed in the disclosure. Explanation will be made in detail below according to specific embodiments.

Figure 10:
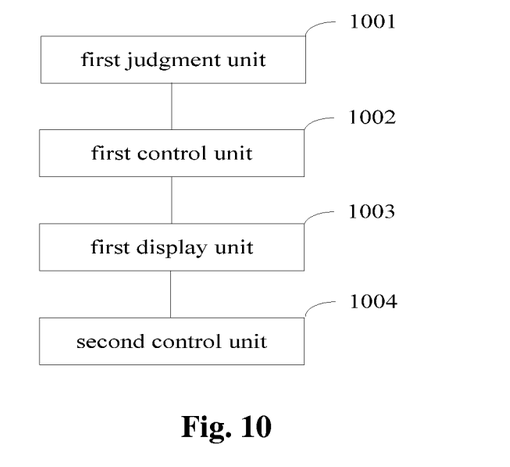
FIG. 10 is a schematic structural diagram of an interface invoking apparatus according to an embodiment of the invention.

Reference is made to FIG. 10, which is a schematic structural diagram of an interface invoking apparatus according to an embodiment of the invention. The interface invoking apparatus includes:

a first judgment unit 1001, a first control unit 1002, a first display unit 1003, and a second control unit 1004.

The first judgment unit 1001 is adapted to judge whether a distance between a first electronic device and a second electronic device is not greater than a preset distance, to obtain a first judgment result.

The preset distance is determined based on the condition of the first electronic device and the second electronic device, and is not limited herein. For example, if the first electronic device is a mobile phone, the second electronic device is a TV, and the distance between the first electronic device and the second electronic device is detected by the mobile phone using the NFC (Near Field Communication), the preset distance needs to be within the effective range of NFC.

The first control unit 1002 is adapted to control an application in the first electronic device for manipulating the second electronic device to be in an on-state if the first judgment result indicates that the distance between the first electronic device and the second electronic device is not greater than the preset distance.

The first display unit 1003 is adapted to display an operating interface corresponding to the application on the display unit of the first electronic device after the first control unit controls the application in the first electronic device for manipulating the second electronic device to be in the on-state.

The second control unit 1004 is adapted to control the operating interface to be in an off-state or hidden state if the first judgment result indicates that the distance between the first electronic device and the second electronic device is greater than the preset distance.

The expression that the operating interface is in an off-state may refer to the situation that both the operating interface and the application corresponding to the operating interface are in an off-state. The expression that the operating interface is in a hidden state may refer to the scene where the application corresponding to the operating interface functions as a background program of the first electronic device and the operating interface is not displayed on the displaying interface.

In the interface invoking apparatus according to the embodiment of the invention, if the first judgment result from the first judgment unit 1001 indicates that the distance between the first electronic device and the second electronic device is not greater than the preset distance, the first control unit 1002 controls the application in the first electronic device 1002 for manipulating the second electronic device to be in an on-state. In this case, the first display unit 1003 displays the operating interface corresponding to the application on the display unit of the first electronic device. If the first judgment result indicates that the distance between the first electronic device and the second electronic device is greater than the preset distance, the second control unit 1004 controls the operating interface to be in an off-state or hidden state. With the interface invoking apparatus according to the embodiment of the invention, the user has no need to find or start the application in the first electronic device for manipulating the second electronic device, and has no need to close or hide the application, so that the operation is simplified and easier.

Figure 11:
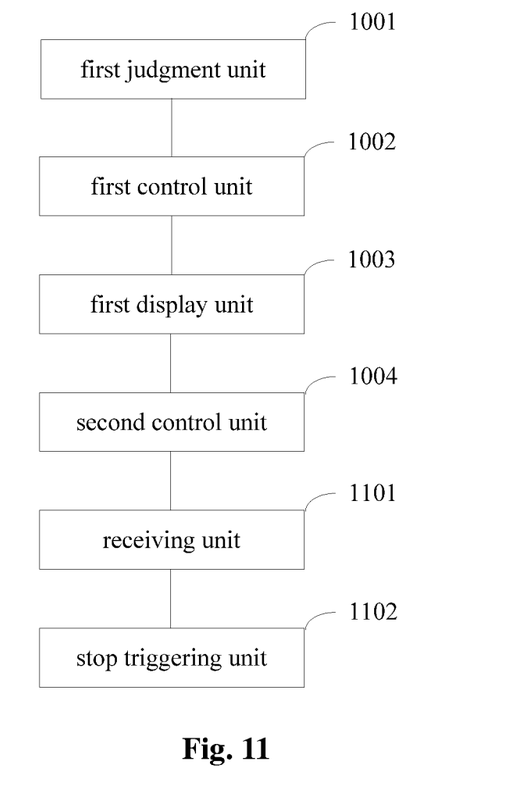
FIG. 11 is a schematic structural diagram of an interface invoking apparatus according to another embodiment of the invention.

Reference is made to FIG. 11, which is a schematic structural diagram of an interface invoking apparatus according to another embodiment of the invention. The interface invoking apparatus includes:

a first judgment unit 1001, a first control unit 1002, a first display unit 1003, a second control unit 1004, a receiving unit 1101 and a stop triggering unit 1102.

Specifically, the first judgment unit 1001 is adapted to judge whether a distance between a first electronic device and a second electronic device is not greater than a preset distance, to obtain a first judgment result.

The first control unit 1002 is adapted to control an application in the first electronic device for manipulating the second electronic device to be in an on-state if the first judgment result indicates that the distance between the first electronic device and the second electronic device is not greater than the preset distance.

The first display unit 1003 is adapted to display an operating interface corresponding to the application on the display unit of the first electronic device after the first control unit 1002 controls the application in the first electronic device for manipulating the second electronic device to be in the on-state.

The second control unit 1004 is adapted to control the operating interface to be in an off-state or hidden state if the first judgment result indicates that the distance between the first electronic device and the second electronic device is greater than the preset distance.

The receiving unit 1101 is adapted to stop triggering to start the application after an instruction to forbid starting the application is received.

In an embodiment of the invention, an instructing unit may also be included. The instructing unit is adapted to unlock the first electronic device and instruct the display unit of the first electronic device to display the operating interface after an unlocking instruction is detected.

In order to refrain from starting the application in the first electronic device for manipulating the second electronic device in the case that the first judgment result indicates that the distance between the first electronic device and the second electronic device is not greater than the preset distance, an option of "starting the corresponding application or not" may be displayed on the display unit of the first electronic device if the distance between the first electronic device and the second electronic device is less than the preset distance, so that the user may make a choice as required. If the user selects "NO", an instruction to forbid starting the application is generated, and in this case, the user can set the valid time of the instruction to forbid starting the application by himself, or a default valid time set in the first electronic device may be employed.

Alternatively, in the case where it is not needed to manipulate the second electronic device via the first electronic device, in order to refrain from starting the application in the first electronic device for manipulating the second electronic device in the case that the first judgment result indicates that the distance between the first electronic device and the second electronic device is not greater than the preset distance, the user may set the valid time of "the instruction to forbid starting the application" in advance. During the valid time, even if the distance between the first electronic device and the second electronic device is not greater than the preset distance, the application in the first electronic device for manipulating the second electronic device can not be in the on-state. The valid time of the instruction to forbid starting the application may also be defined by the system of the first electronic device.

The stop triggering unit 1102 is adapted to stop triggering the first judgment unit during a third preset time period.

Figure 12:
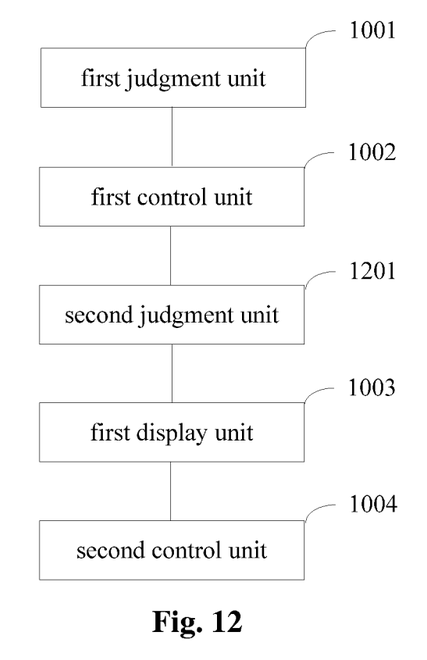
FIG. 12 is a schematic structural diagram of an interface invoking apparatus according to yet another embodiment of the invention.

Reference is made to FIG. 12, which is a schematic structural diagram of an interface invoking apparatus according to yet another embodiment of the invention. The interface invoking apparatus includes:

a first judgment unit 1001, a first control unit 1002, a second control unit 1004, a second judgment unit 1201 and a first display unit 1003.

Specifically, the first judgment unit 1001 is adapted to judge whether a distance between a first electronic device and a second electronic device is not greater than a preset distance, to obtain a first judgment result.

The first control unit 1002 is adapted to control an application in the first electronic device for manipulating the second electronic device to be in an on-state if the first judgment result indicates that the distance between the first electronic device and the second electronic device is not greater than the preset distance.

The second judgment unit 1201 is adapted to judge whether the first electronic device is in a standby state.

The first display unit 1003 is adapted to instruct to display the operating interface of the application on a unlocking interface of the first electronic device after the first control unit 1002 controls the application in the first electronic device for manipulating the second electronic device to be in the on-state, for manipulating the second electronic device by the user.

The second control unit 1004 is adapted to control the operating interface to be in an off-state or hidden state if the first judgment result indicates that the distance between the first electronic device and the second electronic device is greater than the preset distance.

In an embodiment of the invention, a receiving unit 1101 and a stop triggering unit 1102 may be included. In this case, the first display unit 1003 is adapted to, in the case where the first judgment result is positive, the receiving unit 1101 has not received an instruction to forbid starting the application and the first electronic device is in the standby state, instruct to display the operating interface of the application on a unlocking interface of the first electronic device, so that the second electronic device is manipulated by the user.

There are many ways for the first judgment unit 1001 in the above-described three device embodiments to judge whether the distance between the first electronic device and the second electronic device is not greater than the preset distance, three of which are described in detail below. In a first case, the first judgment unit 1001 may include: a first judgment module adapted to judge whether broadcast information sent by the second electronic device is received; and a first determination module adapted to determine that the distance between the first electronic device and the second electronic device is not greater than the preset distance if the broadcast information is received. In a second case, the first judgment unit 1001 may include: a second judgment module adapted to judge whether broadcast information is received for times not less than a preset number of times during a first preset time period; and a second determination module adapted to determine that the distance between the first electronic device and the second electronic device is not greater than the preset distance if the broadcast information is received for times not less than the preset number of times. In a third case, the first judgment unit 1001 may include: a third judgment module adapted to judge whether difference between a time instance for the most recent receipt of broadcast information and a current time instance is not less than a second preset time; and a third determination module adapted to determine that the distance between the first electronic device and the second electronic device is greater than the preset distance if the difference is not less than the second preset time.

In the above-described three device embodiments, a distance sensor may be included in the first judgment unit 1001. The distance sensor is adapted to obtain distance information between the first electronic device and the second electronic device. The distance information may indicate whether the broadcast information is received, how many times the broadcast information is received or the difference between a time instance for the most recent receipt of broadcast information and a current time instance, as above-described.

In the above three device embodiments, the second electronic device includes at least one electronic device, and the first display unit 1003 includes: a setting module adapted to set priorities of respective electronic devices in the second electronic device; and a first instructing module adapted to instruct the display unit of the first electronic device to display the operating interface of the application corresponding to the electronic device with the highest priority in the second electronic device based on the priorities. Alternatively, the first display unit 1003 includes a second instructing module adapted to instruct the display unit of the first electronic device to display shortcuts of the operating interfaces of the applications corresponding to respective electronic devices in the second electronic device, and instruct the display unit of the first electronic device to display the operating interface of the application corresponding to the shortcut selected by a user.

An electronic device is provided in an embodiment of the invention, which includes the interface invoking apparatus according to any one of the device embodiments.

It should be noted that the embodiments of the disclosure are described in a progressive way, each of which emphasizes the differences from others, and the same or similar elements among the embodiments can be referred to each other. Since the device or system disclosed in the embodiments corresponds to the method therein, the description thereof is relatively simple, and for relevant matters references may be made to the description of the method.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The steps of the exemplary methods or algorithms can be implemented with hardware, software modules executed by a processor, or a combination thereof. The software modules may reside in a Random Access Memory (RAM), an internal memory, a Read Only Memory (ROM), an Electrically Programmable ROM, an Electrically-Erasable Programmable ROM, a register, a hard disk, a removable disk drive, CD-ROM, or other types of storage media well known in the field.

With the above descriptions of the disclosed embodiments, the skilled in the art may practice or use the present invention. Various modifications to the embodiments are apparent for the skilled in the art. The general principle suggested herein can be implemented in other embodiments without departing from the spirit or scope of the invention. Therefore, the present invention should not be limited to the embodiments disclosed herein, but has the widest scope that is conformity with the principle and the novel features disclosed herein.

The invention claimed is:

1. An interface invoking apparatus comprising:
at least a processor; and
a memory storing program instructions, wherein in response to being executed by the processor, the program instructions configure the processor to:
judge whether a distance between a first electronic device and a second electronic device is not greater than a first distance, to obtain a first judgment result;
control a first application in the first electronic device to be in an on-state and, after controlling the first application to be in the on-state, controlling the first electronic device to automatically display a first operating interface corresponding to the first application on a display unit of the first electronic device, if the distance between the first electronic device and the second electronic device is not greater than the first distance, wherein the first application is adapted to manipulate the second electronic device, the first operating interface comprising a key, and an operation of the second electronic device is directly controlled via the key of the first operating interface corresponding to the first application;

control the first operating interface to be in an off-state or a hidden state if the distance between the first electronic device and the second electronic device is greater than the first distance;

stop triggering to start the application after an instruction to forbid starting the application is received; and stop judging whether the distance between the first electronic device and the second electronic device is not greater than the first distance during a preset time period.

2. The interface invoking apparatus according to claim 1, wherein the first electronic device is provided with a distance sensor adapted to obtain distance information between the first electronic device and the second electronic device.

3. The interface invoking apparatus according to claim 1, wherein the processor is further configured to:

determine whether broadcast information sent by the second electronic device is received; and determine that the distance between the first electronic device and the second electronic device is not greater than the first distance in response to a reception of the broadcast information.

4. The interface invoking apparatus according to claim 3, wherein the processor is further configured to:

judge whether broadcast information is received for times not less than a preset number of times during a first preset time period; and determine that the distance between the first electronic device and the second electronic device is not greater than the first distance in a case that the broadcast information is received for times not less than the preset number of times.

5. The interface invoking apparatus according to claim 3, wherein the processor is further configured to:

judge whether a difference between a time instance for the most recent receipt of broadcast information and a current time instance is not less than a second preset time; and determine that the distance between the first electronic device and the second electronic device is greater than the first distance in a case that the difference is not less than the second preset time.

6. The interface invoking apparatus according to claim 1, before the displaying an operating interface corresponding to the application on the display unit of the first electronic device, the processor is further configured to:

judge whether the first electronic device is in a standby state; and in a case that the first electronic device is in the standby state, the processor is further configured to instruct to display the operating interface of the application on a unlocking interface of the first electronic device, for manipulating the second electronic device by a user.

7. The interface invoking apparatus according to claim 6, wherein the processor is further configured to:

after an unlocking instruction is detected, perform an unlocking operation and instruct the display unit of the first electronic device to display the operating interface.

8. An electronic device comprising an interface invoking apparatus, wherein the interface invoking apparatus comprises:

at least a processor; and a memory storing program instructions, wherein in response to being executed by the processor, the program instructions configure the processor to:

judge whether a distance between a first electronic device and a second electronic device is not greater than a first distance, to obtain a first judgment result;

control an application in the first electronic device to be in an on-state and, after controlling the first application to be in the on-state, controlling the first electronic device to automatically display a first operating interface corresponding to the application on a display unit of the first electronic device, if the distance between the first electronic device and the second electronic device is not greater than the first distance, wherein the application is adapted to manipulate the second electronic device, a first operating interface comprising a key, and an operation of the second electronic device is directly controlled via the key of the operating interface corresponding to the application;

control the operating interface to be in an off-state or a hidden state if the distance between the first electronic device and the second electronic device is greater than the first distance;

stop triggering to start the application after an instruction to forbid starting the application is received; and stop judging whether the distance between the first electronic device and the second electronic device is not greater than the first distance during a preset time period.

9. The interface invoking apparatus according to claim 1, wherein the second electronic device comprises at least one electronic device, and wherein the processor is further configured to:

set priorities of respective electronic devices in the second electronic device; and instruct the display unit of the first electronic device to display the operating interface of the application corresponding to the electronic device with the highest priority in the second electronic device based on the priorities.

* * * * *